US006426830B1

(12) United States Patent
Robinson

(10) Patent No.: US 6,426,830 B1
(45) Date of Patent: Jul. 30, 2002

(54) SINGLE LENS TURNABLE WAVELENGTH DIVISION MULTIPLEXING FABRY-PEROT FILTER USING MEMS TECHNOLOGY

(75) Inventor: Kevin Cyrus Robinson, Lehigh, PA (US)

(73) Assignees: Lucent Technologies, Inc., Murray Hill, NJ (US); Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/422,411

(22) Filed: Oct. 21, 1999

(51) Int. Cl.[7] .................................................. G02F 1/33
(52) U.S. Cl. .............................. 359/308; 385/3; 359/247
(58) Field of Search ................................. 359/290, 291, 359/237, 247, 293, 245, 124, 871, 308; 385/3, 140; 310/306

(56) References Cited

U.S. PATENT DOCUMENTS 5,212,746 A * 5/1993 Miller et al. .................... 385/25
5,550,373 A * 8/1996 Cole et al. ................. 250/338.1

OTHER PUBLICATIONS

B.M. Anderson, S. Fairchild, V. Aksyuk and N. Thorsten. MEMS Variable Optical Attenuator For DWDM Optical Amplifiers, pp. 260–261.

* cited by examiner

Primary Examiner—Georgia Epps
Assistant Examiner—Tuyen Tra

(57) ABSTRACT

Fabry-Perot filters are disclosed. having micro-electro-mechanical systems (MEMS) parts operable for tuning of the filters. The filters of the present invention are particularly useful in WDM and DWDM optical communication systems for multiplexing and demultiplexing channels of electromagnetically-carried data traversing the system. The filter can be miniaturized by etching or photolithographing the filter on silicon wafers utilizing MEMS technology. A MEMS device fabricated on the wafer is operative for moving a variably positioned mirror to change the length of the cavity or etalon of the Fabry-Perot filter, thereby tuning the filter to multiplex or demultiplex the channels.

7 Claims, 1 Drawing Sheet

SINGLE LENS TURNABLE WAVELENGTH DIVISION MULTIPLEXING FABRY-PEROT FILTER USING MEMS TECHNOLOGY

BACKGROUND OF THE INVENTION

1. Field of the Invention

This invention relates generally to Fabry-Perot filters. More specifically, the invention relates to tunable Fabry-Perot filters for use in wavelength division multiplexing and dense wavelength division multiplexing which have micro-electro-mechanical systems machined parts to tune the filter.

2. Description of the Related Art

In present-day long-haul fiberoptics, it is typically necessary to multiplex and demultiplex a single channel of dense wavelength division multiplexed systems and to select desired frequency bands. To perform these tasks, fixed filters and bulky, tunable filters have been used. Both of these types of prior art filters are largely ineffective since they cannot provide the desired bandwidth resolution needed for modern fiberoptic communication systems, and each of these systems moreover tends to become easily misaligned, thereby degrading the performance of the optical systems in which they are found.

Several approaches have been employed in the past to provide variable optical attenuators (VOAs) for use in broadband, optical, dense wavelength division multiplexing (DWDM) amplifiers and for controlling the input power level to the amplification stages of such long-haul systems. A VOA usually includes an input fiber, an output fiber, a lens to focus light, and a mirror which can be adjusted to change the amount of light traversing through the lens from the input fiber as the light makes its way back to the output fiber. By varying the angle of the mirror, the amount of light received by the output fiber is varied, thereby changing the transmission of the signal. However, VOAs are not adaptable for tuning the signal or for selecting an appropriate frequency band for the fiberoptic system.

Fabry-Perot filters or interferometers, as these terms are used interchangeably throughout, are well known devices that function both as optical spectrum analyzers, channel demultiplexers, and frequency bandpass filters in existing large scale optical systems. However, due to their relatively large and bulky size, as well as the need to provide mirror adjustments, Fabry-Perot interferometers have not made their way into modern, long-haul fiberoptic communication systems. A Fabry-Perot interferometer generally includes an input and output light conduit, for example a fiber, a lens to focus the input light on a stationary mirror, a lens to focus the output light on the output conduit, and a second mirror which is movable so that the length between the stationary mirror and the fixed mirror, sometimes called the cavity or "etalon", can be varied, to thereby vary the optical path length of the light traversing through the cavity. By varying the optical path length, the output light can be multiplexed, demultiplexed, filtered, or band-passed depending on the particular application in which the Fabry-Perot interferometer will be used.

Neither prior art VOAs nor Fabry-Perot interferometers have been effectively implemented in fiberoptic communication systems since both are rather bulky and are difficult to control when reduced in size to fit such systems. Indeed, attempts have been made in the past to miniaturize VOAs in order to package such devices on integrated circuits and place them in fiberoptic communication systems. However, since VOAs are very sensitive and a slight aberration in mirror angle virtually destroys their effectiveness, VOAs cannot function well in long-haul DWDM fiberoptic systems. Moreover, there has not been developed for miniaturized Fabry-Perot filters an effective means for controlling the variable mirror to attain an accurate way of adjusting the cavity length.

There is, accordingly, a long-felt but unresolved need in the art for miniature optical devices that can be used in long-haul fiberoptic communication systems that will efficiently provide DWDM of channels. Moreover, these devices should be simple to fabricate and control. Such needs have not heretofore been fulfilled in the art.

SUMMARY OF THE INVENTION

The aforementioned long-felt needs are met, and problems solved, by Fabry-Perot filters provided in accordance with the present invention. The inventive Fabry-Perot filters are particularly useful for wavelength division multiplexing (WDM) and DWDM of optical channels in long-haul fiberoptic communication systems, which are today becoming ubiquitous for large networks and telecommunication systems. A preferred embodiment of the Fabry-Perot filters disclosed and claimed herein comprises a variable length cavity through which electromagnetic energy of a plurality of wavelength channels will traverse in two opposite directions, and a fixed mirror at one end of the cavity. A variable mirror preferably disposed at the other end of the cavity is movable transversely in the direction of the length of the cavity to vary the cavity's length. Advantageously, a micro-electro-mechanical systems (MEMS) machined part is disposed in contact with the variable mirror for selectively applying force to predeterminedly move the variable mirror along the length of the cavity.

The Fabry-Perot filters of the present invention are excellent devices for multiplexing and demultiplexing dense channels of optical data in modern telecommunication systems. The inventive filters are easily fabricated on a silicon chip that employs MEMS technology and so may be economically mass-produced. The Fabry-Perot filter silicon chips in accordance with the present invention will have low insertion loss, low polarization dependent loss, and a flat response over the desired bands. Furthermore, such Fabry-Perot filters require only a low DC drive voltage to operate. With the use of MEMS technology to produce a mechanical control device for the variable mirror of the inventive Fabry-Perot filters, an efficient and easily controlled filter is obtained. Such results have not heretofore been achieved in the art.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar elements throughout the views.

DETAILED DESCRIPTION OF THE PRESENTLY PREFERRED EMBODIMENTS

Figure 1:
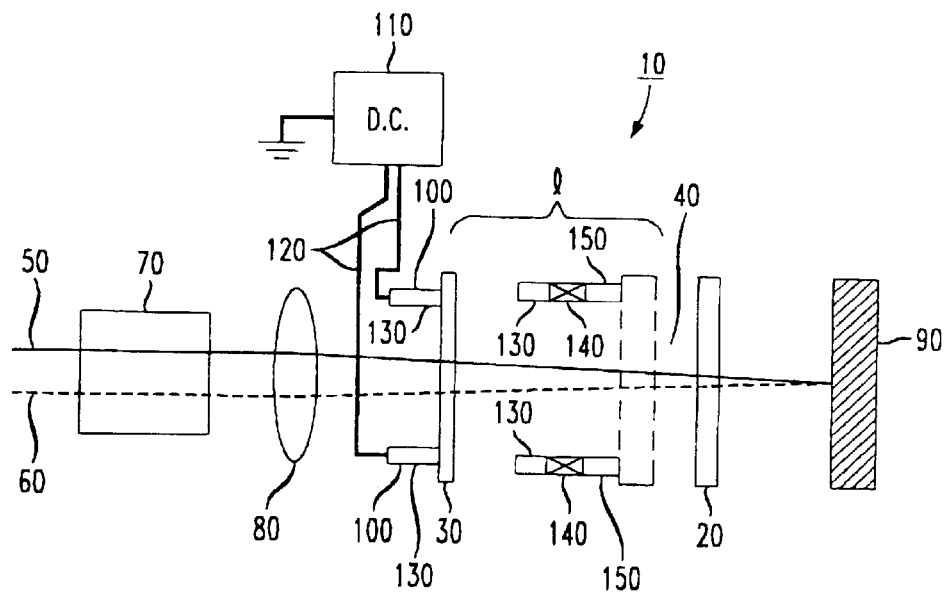
FIG. 1 is a schematic of a Fabry-Perot filter employing MEMS technology in accordance with the present invention.

Referring now to the drawings, by way of illustrative example a Fabry-Perot filter of the present invention is depicted in FIG. 1 and identified by the general reference numeral 10. Fabry-Perot filters are well-known in the opto-electronics art and, indeed, were invented over eighty years ago in conjunction with the study of optics and light physics especially as these fields developed interferometers and interferometric techniques. Hence, the general optical theory of Fabry-Perot interferometers is well understood. A theoretical treatment of Fabry-Perot interferometers and theory is set forth in Yariv, "Optical Electronics" ($2^{nd}$ Edition) pp. 62–65, the teachings of which are expressly incorporated herein by reference.

Fabry-Perot filter 10 includes a first mirror 20 that is positionally fixed. A second mirror 30 that is movable and substantially optically aligned with first mirror 20 forms, with first mirror 20, a cavity or etalon 40 having a length 1. The length 1 is varied in the direction of the length of cavity 40 as second mirror 30 moves transversely along the direction of length 1 when filter 10 is being tuned in accordance with the invention as discussed in greater detail below. Mirrors 20, 30 are preferably highly polished reflective mirrors which couple an input optical fiber 50 to an output optical fiber 60 through a two-fiber capillary 70 that holds the fibers 50, 60 in optical alignment with mirrors 20, 30 and mechanically holds fibers 50, 60 within filter 10.

A lens 80 is located proximate the output position of input fiber 70 and focuses light from fiber 70 onto the mirrors 20, 30 to ensure that all of the light emitted from input fiber 70 to cavity 40 is captured within cavity 40. Although lens 80 is depicted for illustrative purposes as a concave lens, other types of lenses are of course usable in filter 10 to focus the light on mirrors 20, 30 such as, for example, a convex, a planar, a circular and cylindrical lenses. As will be understood by those skilled in the art, mirrors 20, 30 are only partially reflecting which allows the cavity to be irradiated only with that desired amount of light intensity which will be multiplexed or demultiplexed by filter 10. Even more preferably, a high reflectivity mirror 90 is included in or with filter 10 at the far end of cavity 40 for coupling the input fiber to the output fiber, and for ensuring that any light which unintentionally exits cavity 40 is reflected back to the cavity so that the filter is low-loss.

In a highly preferred aspect of the invention, MEMS devices are disposed in contact with second mirror 30 for operatively applying forces to move or translate second mirror 30 along the lengthwise or optical axis of cavity 40 and thereby vary the length 1. MEMS technology is well known to those skilled in the art and is a process whereby micron-sized mechanical devices are fabricated on silicon wafers by photolithography and etching techniques. These mechanical devices are formed on integrated circuit chips such that devices that incorporate MEMS technology essentially become miniature electromechanical systems. Examples of such MEMS electromechanical systems are described in M. N. Hornstein, T. G. Bifano, R. Krishnamoorthy and N. Vandelli, "Electrostatic Effects in Micromachined Actuators for Adaptive Optics," 42 Journal of Electrostatics 69–81 (1997), the teachings of which are expressly incorporated herein by reference. MEMS devices are activated by analog voltages which create an electric field that will cause the MEMS devices to physically deflect since they are made of silicon and therefore respond to the electric field.

Accordingly, a DC power supply 110 is connected to MEMS devices 100 through leads 120 to bias MEMS devices 100 and cause transverse movement of variable mirror 30, thereby changing the length of cavity 40. One of the advantages of using MEMS devices 100 on a silicon integrated circuit chip is that these devices are low power, low voltage devices. Preferably, voltages of between about 0 and 10 volts are all that are necessary to provide the desired deflection of MEMS devices 100. These low voltages ensure low attenuation of the cavity signals and low insertion losses. Applied voltages of between about 0 and 10 volts also reduce the polarization dependent loss for high signal attenuation. These results have not heretofore been achieved in the Fabry-Perot filter art. Moreover, while power supply source 110 has been shown as a DC power supply, it will be recognized by those with skill in the art that power supply 100 could alternately be an AC source with appropriate rectifying circuitry, or an AC source that directly applies power to MEMS devices 100 where MEMS devices 100 are configured for actuation by AC power.

MEMS devices 100 can be any kind of mechanical actuator operable to uniformly and easily move mirror 30 along cavity length 1. For example, cantilevered arms, pivot points, spring-like or other resilient mechanisms, levers, moment arms, torque generating devices, and other devices and equivalents thereof that can apply the correct amount of force to mirror 30 are all configurable in silicon MEMS devices and are within the scope of the present invention. In the currently preferred embodiment, MEMS devices 100 are implemented by a pair of pistons that are extendable to uniformly push against mirror 30 to move mirror 30 in the direction of the length of cavity 40. Pistons 100 comprise a backstop portion 130 that is physically connected to leads 120 to receive power from power supply 110. A resilient member 140 is provided to pistons 100 mechanically connected to backstop members 130 and. which will move in the direction I of cavity 40 against backstop portions 130 when power is supplied from supply 110. A plunger 150 is mechanically connected to the opposite end of resilient member 140 from its connection to backstop member 130. Plunger 150 engages the surface of mirror 30 to move mirror 30 along the length of cavity 40 as force is uniformly applied by resilient member 140, as shown in phantom in FIG. 1. The dual piston MEMS system shown advantageously provides substantially equal force to the two ends of mirror 30 so that mirror 30 is uniformly advanced along the length of cavity 40. This overcomes the disadvantages of prior MEMS VOAs that utilize a single, cantilevered lever that can easily cause the reflecting mirror therein to become misaligned.

By using the two highly reflective mirrors 20, 30 in accordance with the invention in a silicon MEMS integrated circuit for multiplexing and demultiplexing channels in Fabry-Perot filter 10, the variable spacing of cavity 40 advantageously need be varied by only about a half a wavelength, or about 0.75 micrometers, to scan the wavelengths in a free spectral range in the preferred 1530 to 1570 nm window. The cavity length 1 can be calculated as follows:

$$1 = \lambda(\lambda + \lambda\_delta)/\{n\_cavity(2\lambda\_delta)\},$$

where for $\lambda = 1.55$ micrometers, $\lambda\_delta = 40$ nm, and n_cavity (the index of refraction of the cavity)=1.00, so that 1=31 micrometers.

The 40 nm range may be scanned by changing the spacing between mirrors 20, 30 by one-half wavelength or approximately 0.78 micrometers.

Many modern WDM and DWDM optical communication systems have channels spaced about 100 GHz apart in accordance with a requirement imposed by the International Telecommunications Union (ITU). By selecting a single-pass, half power resolution ($v\_\frac{1}{2}$) of 75 GHz to comply with the ITU, the necessary reflectivity (R) of mirrors 20, 30 can be calculated from the following equation:

$$v\_\frac{1}{2} = c/\{2n\_\text{cavity } 1 \cos(\theta\_\text{in}\_\text{cavity})\pi\sqrt{(R/[1-R])}\},$$

where c is the speed of light and ($\theta\_\text{in}\_\text{cavity}$) is the angle of the light wavelengths incident to cavity 40. In this case, R=96%, which is a readily attainable reflectivity in silicon machined integrated circuits.

As a consequence of the design of Fabry-Perot filter 10, cavity 40 is passed through twice by the light of the channel, which ensures high wavelength selectivity. Moreover, filter 10 utilizes only one lens 80 and a single, two-fiber termination 70 that lowers manufacturing costs. Additionally, the selectivity of filter 10 is defined by the reflectivity R of the mirrors 20, 30 while the tuning range is defined by the rest cavity length, i.e. the length 1 when pistons 100 are not extended. These parameters allow for easy tuning and highly effective multiplexing and demultiplexing. Such results have not heretofore been achieved in the art.

Figure 2:
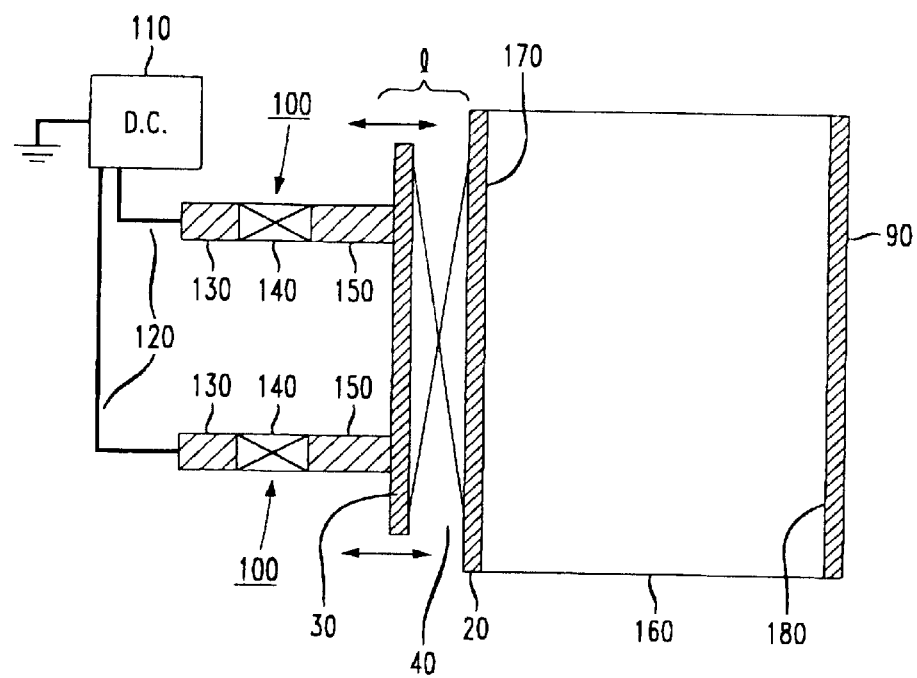
FIG. 2 is a schematic of a preferred mirror system of the Fabry-Perot filter of FIG. 1.

Referring now to FIG. 2, a preferred construction of mirrors 20, 30 and highly reflective mirror 90 is depicted. Variable mirror 30 may comprise a metallized membrane in a silicon micro-mechanical device. A substrate 160 provides a first surface 170 on which fixed mirror 20 is formed. In the embodiment of FIG. 2, fixed mirror 20 is a metallized top of surface 170. Similarly, highly reflective mirror 90 is formed on the back surface 180 of substrate 160 by metallizing the back surface of substrate 160.

The pistons 100 operate as described above against variable mirror 30 to change the length 1 of cavity 40. Substrate 160 is preferably a silicon substrate, although it will be recognized by those skilled in the art that other substrates may be employed, such as GaAs, when it is desired to micro-machine the MEMS devices from such other substrates. In either of the embodiments of FIG. 1 or FIG. 2, it is generally desirable to polish highly reflective mirror 90 at a slight angle with respect to mirrors 20, 30, e.g. about 0.5 degrees, to make mirror 90 transparent at about 1.5 micrometers wavelength. This ensures that light at the high energy end of the channel passes through the cavity so that only the desired wavelengths are multiplexed or demultiplexed.

Thus, the Fabry-Perot filters of the present invention provide efficient, accurate and economical multiplexing and demultiplexing of WDM or DWDM channels of optical data. By fabricating the inventive filters on a silicon chip that employs MEMS technology, the filter may be economically mass-produced. The Fabry-Perot silicon filters of the present invention exhibit low insertion loss, low polarization dependent loss and a flat response over the desired bands. Furthermore, such Fabry-Perot filters require only a low DC drive voltage to operate. With the use of MEMS technology to produce a mechanical control device for the variable mirror of the inventive Fabry-Perot filters, an efficient and easily controlled filter is obtained. Such results have not heretofore been achieved in the art.

While there has been shown and described certain fundamental novel features of the present invention as applied to a preferred embodiment thereof, it will be understood by those skilled in the art that various omissions and substitutions and changes in the devices described herein, and in their operation, may be made by those skilled in the art without departing from the spirit and scope of the invention. It is expressly intended that all combinations of those elements and/or method steps that perform substantially the same function and substantially the same way to achieve the same results are within the scope of the invention. Substitutions of elements from one described embodiment to another are also fully intended and contemplated. It is the intention, therefore, to be limited only as indicated by the scope of the claims appended hereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A tunable, Fabry-Perot filter for selectively and dynamically receiving wavelengths for wavelength division multiplexing and demultiplexing of a channel, comprising:

a variable length cavity through which electromagnetic energy of a plurality of wavelengths in the channel is traversable along a transmission axis in two, opposite directions;

a fixed mirror disposed at one end of the variable length cavity;

a variable mirror disposed at the other end of the variable length cavity and defining between the fixed and variable mirror a length of the cavity, said variable mirror being disposed for movement along the transmission axis to vary the length of the cavity for thereby multiplexing and demultiplexing a desired wavelength band from a channel carried by the electromagnetic energy;

a micro-electro-mechanical systems (MEMS) machined part in contact with the variable mirror and operable for selectively applying a force to move the variable mirror along the transmission axis and thereby vary the length of the cavity;

an input fiber for carrying the electromagnetic energy to the variable length cavity;

an output fiber for receiving and carrying electromagnetic energy that has been tuned by the Fabry-Perot filter from the variable length cavity to a communication system;

a lens interposed between the input fiber and the variable mirror for focusing light from the input fiber onto the variable mirror; and a highly reflective mirror proximate an end of the variable length cavity for coupling the input fiber to the output fiber.

2. A tunable, Fabry-Perot filter for selectively and dynamically receiving wavelengths for wavelength division multiplexing and demultiplexing of a channel, comprising:

a variable length cavity through which electromagnetic energy of a plurality of wavelengths in the channel is traversable along a transmission axis in two, opposite directions;

a fixed mirror disposed at one end of the variable length cavity;

a variable mirror disposed at the other end of the variable length cavity and defining between the fixed and variable mirror a length of the cavity, said variable mirror being disposed for movement along the transmission axis to vary the length of the cavity for thereby multiplexing and demultiplexing a desired wavelength band from a channel carried by the electromagnetic energy; and a micro-electro-mechanical systems (MEMS) machined part in contact with the variable mirror and operable for selectively applying a force to move the variable mirror along the transmission axis and thereby vary the length of the cavity, wherein the MEMS machined part comprises a MEMS piston disposed in contact with the variable mirror for applying the force to the variable mirror to change the length of the cavity.

3. The Fabry-Perot filter of claim 2, further comprising a power supply coupled to the MEMS piston for applying an operating electric field to the MEMS piston to cause the MEMS piston to operatively deflect and move the variable mirror and thereby change the length of the cavity.

4. The Fabry-Perot filter of claim 3, wherein the power supply comprises a DC power supply.

5. A tunable, Fabry-Perot filter for selectively and dynamically receiving wavelengths for wavelength division multiplexing and demultiplexing of a channel, comprising:

a variable length cavity through which electromagnetic energy of a plurality of wavelengths in the channel is traversable along a transmission axis in two, opposite directions;

a fixed mirror disposed at one end of the variable length cavity;

a variable mirror disposed at the other end of the variable length cavity and defining between the fixed and variable mirror a length of the cavity, said variable mirror being disposed for movement along the transmission axis to vary the length of the cavity for thereby multiplexing and demultiplexing a desired wavelength band from a channel carried by the electromagnetic energy;

a micro-electro-mechanical systems (MEMS) machined part in contact with the variable mirror and operable for selectively applying a force to move the variable mirror along the transmission axis and thereby vary the length of the cavity; and a substrate having two ends in optical communication with the variable mirror, wherein the fixed mirror is metallized on a first of the two ends of the substrate.

6. The Fabry-Perot filter of claim 5, further comprising a highly reflective mirror metallized on a second end of the substrate.

7. The Fabry-Perot filter of claim 6, wherein the substrate comprises silicon.

* * * * *